US006351326B1

(12) United States Patent
Morse et al.

(10) Patent No.: US 6,351,326 B1
(45) Date of Patent: Feb. 26, 2002

(54) METHOD AND APPARATUS FOR OPTICALLY MODULATING LIGHT UTILIZING A RESONANT CAVITY STRUCTURE

(75) Inventors: Michael T. Morse, San Jose; Mario J. Paniccia; Dmitri Nikonov, both of Santa Clara, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/465,222

(22) Filed: Dec. 14, 1999

(51) Int. Cl.[7] .................................................. G02F 1/03
(52) U.S. Cl. ....................................... 359/245; 359/237
(58) Field of Search ................................ 359/245, 246, 359/247, 248, 249

(56) References Cited

U.S. PATENT DOCUMENTS

| | | |
|---|---|---|
| 4,422,088 A | 12/1983 | Gfeller |
| 4,695,120 A | 9/1987 | Holder |
| 4,758,092 A | 7/1988 | Heinrich et al. |
| 4,761,620 A | 8/1988 | Bar-Joseph et al. |
| 4,799,749 A * | 1/1989 | Borner et al. ............ 350/96.13 |
| 4,865,427 A | 9/1989 | Kingston et al. |
| 4,871,224 A | 10/1989 | Karstensen et al. |
| 4,917,450 A | 4/1990 | Pocholle et al. |
| 4,966,430 A | 10/1990 | Weidel |
| 5,061,027 A | 10/1991 | Richard |
| 5,153,770 A | 10/1992 | Harris |
| 5,159,700 A | 10/1992 | Reid et al. |
| 5,198,684 A | 3/1993 | Sudo |
| 5,400,419 A | 3/1995 | Heinen |
| 5,432,630 A | 7/1995 | Lebby et al. |
| 5,434,434 A | 7/1995 | Kasahara et al. |
| 5,485,021 A | 1/1996 | Abe |
| 5,502,779 A | 3/1996 | Magel |
| 5,568,574 A | 10/1996 | Tanguay, Jr et al. |
| 5,605,856 A | 2/1997 | Goosen et al. |
| 5,625,636 A | 4/1997 | Bryan et al. |
| 5,629,838 A | 5/1997 | Knight |
| 5,638,469 A | 6/1997 | Feldman et al. |
| 5,696,862 A | 12/1997 | Hauer et al. |
| 5,835,646 A | 11/1998 | Yoshimura et al. |
| 5,864,642 A | 1/1999 | Chun et al. |
| 5,872,360 A | 2/1999 | Paniccia et al. |

OTHER PUBLICATIONS

Fernando, C. et al: "Si/Si$_{0.85}$/GE$_{0.15}$/Si P–I–N Waveguide Optical Intensity Modulator," SPIE, vol. 2402(131), 1995.
Alping, A et al.: "Highly Efficient Waveguide Phase Modulator for Integrated Optoelectronics," Appl. Phys. Lett., 48(19), May 1986.
Levitan, SP et al.: "Computer–Aided Design of Free–Space Opto–Electronic Systems," DAC 97, Anaheim, California (1997).

(List continued on next page.)

Primary Examiner—Hung Xuan Dang
(74) Attorney, Agent, or Firm—Blakely, Sokoloff, Taylor & Zafman LLP

(57) ABSTRACT

An optical modulator that modulates an optical beam through directed through an integrated circuit die. In one embodiment, the optical beam is directed into and out of a flip chip packaged integrated circuit die. In one embodiment, the optical modulator includes a resonant cavity structure. In one embodiment, the resonant cavity structure is disposed in the dielectric layer of the integrated circuit die. In one embodiment, the optical beam is directed into the integrated circuit die and through the resonant cavity structure and is modulated in response to an integrated circuit signal of the integrated circuit die. In one embodiment, the optical beam is modulated by modulating the resonant wavelength of the resonant cavity structure in response to the integrated circuit signal. A modulated optical beam is directed from the resonant cavity structure back out of the integrated circuit die.

30 Claims, 3 Drawing Sheets

OTHER PUBLICATIONS

Goosen, KW: "GaAs MQW Modulators Integrated With Silicon CMOS" in IEEE Photonics Technology Letters, vol.7(4), April 1995.

Wang, C. et al.: "Ultrafast, All–Silicon Light Modulator," Optics Letters, 19(18), Sep. 1994.

Tada, K. and Okada, Y: "Bipolar Transistor Carrier–Injected Optical Modulator/Switch: Proposal and Analysis," IEEE Electr Dev Ltrs, 7(11), 1986.

Liu, MY and Chou, SY: "High–Modulation–Depth and Short–Cavity–Length Silicon Fabry–Perot Modulator with Two Grating Bragg Reflectors" in Appl. Phys. Lett. Vol. 68(2), Jan. 1996.

Koren, U., et al.: "A Polarization Insensitive Semiconductor Optical Amplifier with Integrated Electroabsorption Modulators" in Integrated Photonics Research, Apr. 29–May 2, 1996 Technical Digest Series, vol. 6, 1996.

Krishnamoorthy, AV, and Miller, DABM: "Free–Space Optical Interconnections for VLSI Systems: A Technology Roadmap", Conference Proceedings Leos '96 9th Annual Meeting U IEEE Lasers and Electro–Optics (vol.1,), Nov. 1996.

Cutolo, A., et al.: "An Electrically Controlled Bragg Reflector Integrated in a Rib Silicon on Insulator Wavequide" in Appl. Phys. Sett. vol 71(2), Jul. 1997.

Silva, MTC, and Herczfeld PR: "Optical Intensity Modulator Based on Electrically Induced Periodic Structrue" Optoelectronics and Systems Research Laboratory, Sao Paulo & Center for Microwave and Lightwave Engineering, Drexel Univ., Philadelphia, PA.

Kuwamura, Y, et al.: "Analysis of Operating Mechanism in Semiconductor Optical Modulator with Electron–Depleting Absorption Control" in Electronics and Communications in Japan, vo. 79(5), Dec. 1995.

Heinrich, HK: "A Noninvasive Optical Probe for Detecting Electrical Signals in Silicon Integrated Circuits", Doctoral Dissertation, Stanford Univ., (Apr., 1987).

Orobtchouk, R., et al.: "Quasi–TEoo Singlemode Optical Waveguides for Electro–optical Modulation at 1.3$\mu$m Using Standard SIMOX Material" in IEEE Proc. Optoelectron, vol. 144(2) Apr. 1997.

Soref, RA: "Electrooptical Effects of Silicon" in IEEE J of Quantum Electron. vol.QE–23(1), Jan.1997.

Cutolo, A., et al.: Sillicon Electro–Optic Modulator Based on a Three Terminal Device Integrated in a Low–Loss Single–Mode SOI Waveguide in J. of Lightwave Technology, vol.15(3), Mar. 1997.

Raybon, G., et al.: "A Reconfigurable Optoelectronic Wavelength Converter based on an Integrated Electroabsorption Modulated Laser Array" in 1997 Digest of the IEEE/LEOS Summer Topical Meetings, Montreal, Quebec, Canada, Aug. 1997.

Reiley, DJ, and Sasian JM: "Optical Design of a Free–Space Photonic Switching System" in Applied Optics, vol. 36(19), Jul. 1997.

"Optoelectronic VLSI Foundry Services From Lucent Technologies", Lucent Technologies Bell Labs Innovations Web Page at http://www.bell–labs.com/project/oevlsi/, updated Mar. 2, 1997.

"Process for Fabricating OE/VLSI Chips", Lucent Technologies Bell Labs Innovations Web Page at http://www-.bell–labs.com/project/oeflsi/wfabproc.html, updated Sep. 26, 1996.

"Detailed Design Rules for Workshop Chips", Lucent Technologies Bell Labs Innovations Web Page at http://www-.bell–labs.com/roject/oevlsi/wdesrule.html, updated Mar. 7, 1997.

Goodman, JW et al.: "Optical Interconnections for VLSI System," Proc.IEEE, 72(7), Jul. 1984.

J.S. Foresi et al.: Measurement of cavity resonance in a PBG waveguide microcavity at $\lambda$=1.564$\mu$m, Presentation at CLEO '97, May 22, 1997.

Miller, DAB: "Reason and Prospects for Dense Optical Interconnections", Presentation by Stanford University Professor, (Oct. 1997).

Sakano, S. et al.: "InGaAsP/InP Monolithic Circuit with Lasers and an Optical Switch," Electronics Letters, 22(11), May 1986.

Mansuripur, M. and Goodman, JW: "Signal and Noise in Magneto–Optical Readout," J. Appl. Phys., 53(6), Jun. 1982.

* cited by examiner

METHOD AND APPARATUS FOR OPTICALLY MODULATING LIGHT UTILIZING A RESONANT CAVITY STRUCTURE

BACKGROUND OF THE INVENTION

1. Field of the Invention

The present invention relates generally to integrated circuits and, more specifically, the present invention relates to the modulation of light using integrated circuits.

2. Background Information

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low-inductance packaging and large amount of on-die decoupling capacitance to provide a means of noise suppression, dissipate more heat and occupy more of valuable area on the integrated circuit die than smaller integrated circuit input/output drivers.

Other prior art attempts to overcome traditional integrated circuit interconnection limitations have included the use of optical interconnections. The prior art attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon-based metal oxide semiconductor (MOS) technology.

The second typical prior art approach is based on using silicon based optical waveguides. These waveguides are generally built using Silicon-on-Insulator (SOI) based processing techniques. Prior art SOI based modulators utilize silicon waveguide structures to switch light passing through the optical waveguide. The switching mechanism however utilizes injection of carriers into the waveguide rather like in a bipolar-based transistor. One consequence of this is slow speed, for example up to several hundred megahertz, and very high power consumption, for example 10 mW or more for a single switch. In order to increase the modulation depth, one often tries to obtain a large interaction volume between the injected charge and the optical beam. This is generally accomplished by making very long waveguides, for example on order of thousands of microns, thereby increasing the interaction length through which the optical beam travels. As can be appreciated to those skilled in the art, actual incorporation of SOI waveguides into existing multi-layer standard MOS based processing however is not straight forward. Hence, utilization of these waveguide structures becomes quite impractical when used for high-speed input/output in large transistor count microprocessors.

Acquiring electrical signals out of integrated circuits is also of great importance for testing integrated circuits. As the circuits get denser, as the size of transistors get smaller and as circuit speeds get faster, electrically probing the internal transistor nodes becomes more difficult, especially with flip chip bonding and other new packaging technologies.

SUMMARY OF THE INVENTION

An apparatus and method for modulating an optical beam are disclosed. In one embodiment, the method includes directing an optical beam into a resonant cavity structure. In one embodiment, the resonant cavity structure is disposed in a dielectric layer proximate to a semiconductor substrate of an integrated circuit die. In one embodiment, a resonant wavelength of the resonant cavity structure is then modulated. In one embodiment, the resonant wavelength is modulated in response to and an integrated circuit signal of the integrated circuit die. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus providing an optical modulator is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

One embodiment of the present invention provides an optical modulator that enables integrated circuit signals to be extracted optically from integrated circuit output circuit nodes through the back side of the semiconductor substrate of a integrated circuit die. In one embodiment, an optical modulator is disposed within a flip chip packaged integrated circuit die. In another embodiment, the optical modulator is not limited to being disposed within a flip chip packaged integrated circuit die. In one embodiment, an optical beam is directed through the backside of a semiconductor substrate of an integrated circuit die. In one embodiment, the optical beam is directed into and through a polysilicon waveguide including a resonant cavity structure. In one embodiment, the semiconductor substrate includes silicon and the optical beam includes infrared or near-infrared laser light. As known to those skilled in the art, silicon is partially transparent to infrared or near infrared light.

In one embodiment, the resonant cavity structure disposed in a dielectric layer of the integrated circuit die. In one embodiment, the resonant cavity structure is formed with a dielectric stack having a periodic structure of periodically spaced regions of polysilicon and silicon dioxide. In one embodiment, the resonant wavelength of the periodic structure of the resonant cavity is tuned to be approximately equal to the wavelength of the optical beam. In one embodiment, the resonant wavelength is modulated in response to an integrated circuit signal of the integrated circuit die.

In order to modulate the resonant wavelength of the resonant cavity, the periodically spaced regions of polysilicon are in one embodiment coupled to receive an integrated circuit signal. In one embodiment, the density of free charge carriers in the periodically spaced regions of polysilicon is modulated in response to the integrated circuit signal. As a result of the modulated charge density, the index of refraction of the regions with modulated charge is modulated. In one embodiment, modulation of the index refraction of the charged regions results in a modulation of the reflectivity, which results in the modulation of the optical beam.

Figure 1:
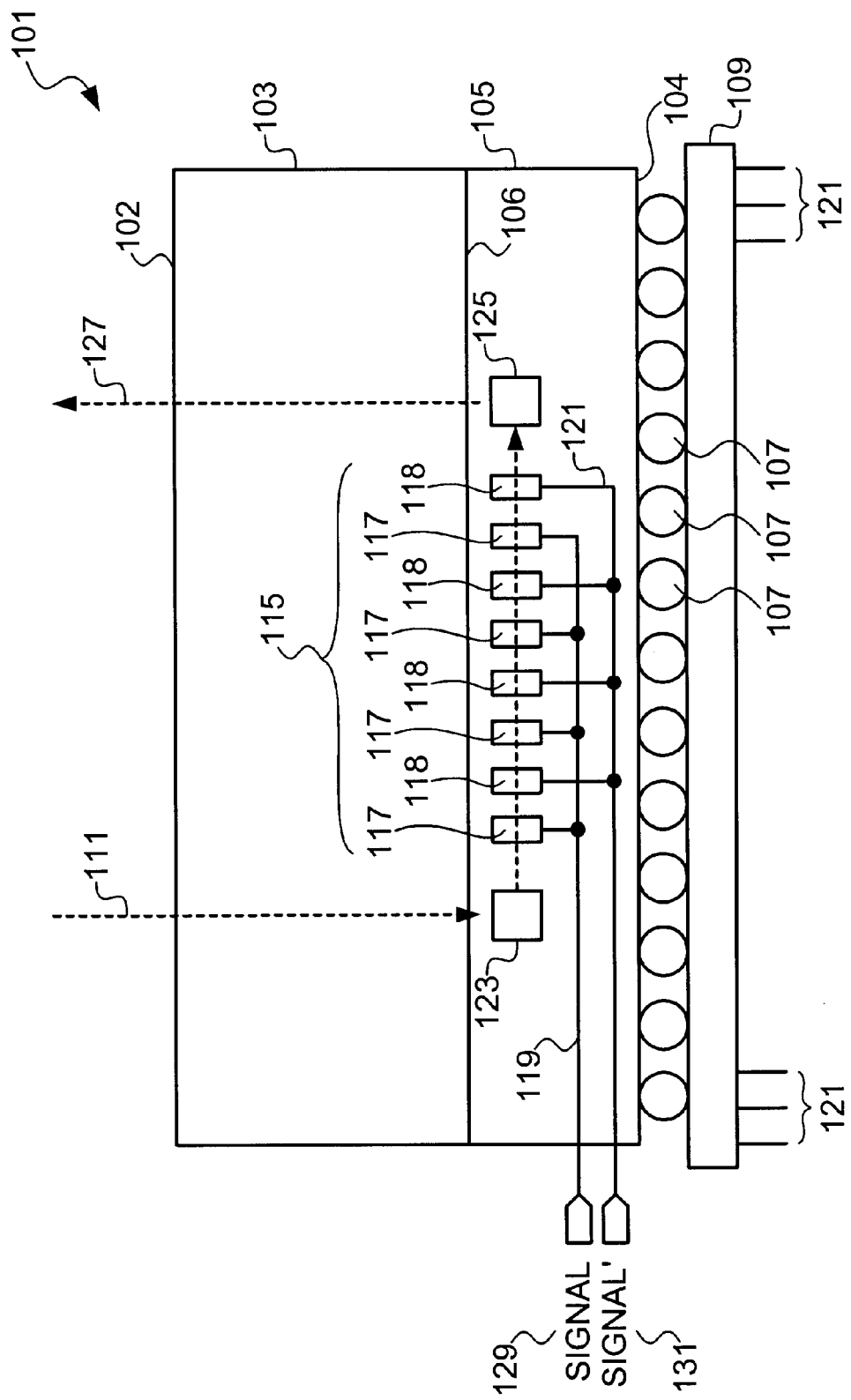
FIG. 1 is an illustration of a cross section of one embodiment of a flip chip packaged integrated circuit die including an optical modulator having a resonant cavity structure in accordance with the teachings of the present invention.

FIG. 1 is an illustration of a cross section of one embodiment of a flip chip packaged integrated circuit die 101 including an optical modulator having a resonant cavity structure 115 in accordance with the teachings of the present invention. In one embodiment, integrated circuit die 101 is a controlled collapse circuit connection (C4) or flip-chip packaged integrated circuit die coupled to package substrate 109 through ball bonds 107. As can be appreciated by those skilled in the art, ball bonds 107 provide more direct connections between the internal integrated circuit nodes of integrated circuit die 101 and the pins 121 of package substrate 109, thereby reducing inductance problems associated with typical wire bond integrated circuit packaging technologies. In one embodiment, the internal integrated circuit nodes of integrated circuit die 101 are located towards the front side 104 of integrated circuit die 101. Another characteristic of flip chip packaging is that full access to a backside 102 of integrated circuit die 101 is provided. It is appreciated that in another embodiment, integrated circuit die 101 is not limited to being mounted in a flip chip packaged configuration.

In one embodiment, the optical modulator of the present invention includes the resonant cavity structure 115 disposed in a dielectric layer 105 of integrated circuit die 101. In one embodiment, dielectric layer 105 includes silicon dioxide and is disposed proximate to semiconductor substrate 103 of integrated circuit die 101. In one embodiment, resonant cavity structure 115 includes periodically spaced regions of polysilicon 117 and 118 disposed in dielectric layer 105. In one embodiment, the periodically spaced regions of polysilicon 117 and 118 form a dielectric stack in a polysilicon waveguide in dielectric layer 105. As will be discussed, in one embodiment, a resonant wavelength of the resonant cavity structure is determined by the indices of refraction of the polysilicon, of the dielectric layer 105, and by the thicknesses of the periodic structure of the resonant cavity structure 115.

In one embodiment, an optical beam 111 is directed into semiconductor substrate 103 through the backside 102 and directed into and through the resonant cavity structure 115. In another embodiment, optical beam 111 is directed horizontally through the sides integrated circuit die 101 through resonant cavity structure 115. In still another embodiment, optical beam 111 is directed through the front side 104 of integrated circuit die 101 and directed through the resonant cavity structure 115. In one embodiment, an optical element 123 is optically coupled to resonant cavity structure 115 such that optical beam 111 is directed to into the resonant cavity structure 115 through optical element 123. In one embodiment, optical element 123 includes a deflector to deflect optical beam 111 into resonant cavity structure 115. In one embodiment, a deflector is provided using a reflective surface such as for example but not limited to a reflective metal or conductor in the dielectric layer 105. In another embodiment, optical element 123 includes a diffractor or other type of diffractive optics to direct optical beam 111 into resonant cavity structure 115. In one embodiment, diffractive optics are provided by for example but not limited to a diffraction grating in the dielectric layer 105. In still another embodiment, optical element 123 utilizes a waveguide or the like to direct optical beam 111 into resonant cavity structure 115.

In one embodiment, after optical beam 111 is directed through resonant cavity structure 115, a modulated optical beam 127 is directed back through semiconductor substrate 103 and exits back out through the backside 102. In one embodiment, an optical element 125 is optically coupled to resonant cavity structure 115 such that modulated optical beam 127 is directed from the resonant cavity structure 115 to optical element 123 and out through back side 102. In one embodiment, optical element 125 includes a deflector to deflect modulated optical beam 127 back out through the backside 102. In one embodiment, a deflector is provided using a reflective surface such as for example but not limited to a reflective metal or conductor in the dielectric layer 105. In another embodiment, optical element 125 includes a diffractor or other type of diffractive optics to direct modulated optical beam 127 back out through the backside 102. In one embodiment, diffractive optics are provided by for example but not limited to a diffraction grating in the dielectric layer 105. In still another embodiment, optical element 125 utilizes a waveguide or the like to direct modulated optical beam 127 back out through the backside 102.

In another embodiment, optical beam 111 is directed through the side of integrated circuit die 111 into optical element 123 and modulated optical beam 127 is directed out from optical element 125 through the side of integrated circuit die 111. In still another embodiment, optical beam 111 is directed through the front side 104 of integrated circuit die 111 into optical element 123 and modulated optical beam 127 is directed out from optical element 125 through the front side 104 of integrated circuit die 111.

As illustrated in the embodiment depicted in FIG. 1, the periodically spaced regions of polysilicon 117 are in one embodiment coupled to receive an integrated circuit signal 129 of the integrated circuit die 101. In one embodiment, the periodically spaced regions of polysilicon 117 are doped such that there are free charge carriers. In one embodiment, the charge density of free charge carriers in the periodically spaced regions of polysilicon 117 is modulated in response to integrated circuit signal 129.

In another embodiment, the periodically spaced regions of polysilicon 117 and 118 are alternatingly coupled to receive opposite polarities of the integrated circuit signal. This embodiment is illustrated in FIG. 1 with the periodically spaced regions of polysilicon 117 and 118 alternatingly coupled to receive either signal 129 or signal' 131 through conductors 119 and 121, respectively. In one embodiment, signal' 131 is substantially the same signal as signal 129 with the exception of being the opposite polarity. In yet another embodiment, the periodically spaced regions of polysilicon 117 and 118 are alternatingly coupled to receive either signal 129 or ground (not shown). In either of the above embodiments, the charge density of free charge carriers in the periodically spaced regions of polysilicon 117 and 118 is modulated in response to integrated circuit signal 129, and signal' 131, if applicable.

Figure 2:
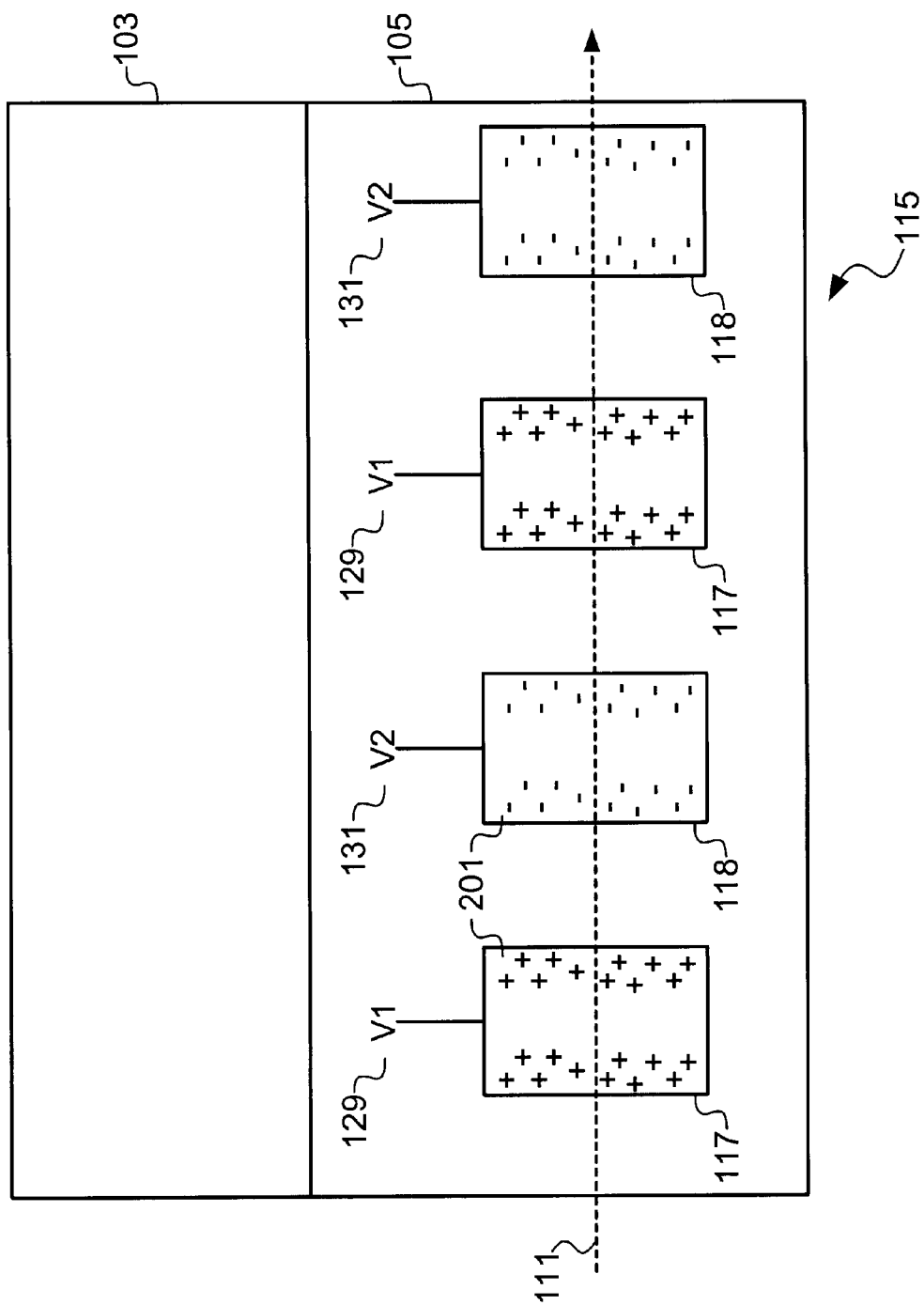
FIG. 2 is an illustration of a cross section showing greater detail of one embodiment of free charge regions formed in an optical modulator having a resonant cavity structure in accordance with the teachings of the present invention.

To illustrate, FIG. 2 is a diagram showing greater detail of one embodiment of one of the periodically spaced regions of polysilicon 117 and 118 between dielectric regions 105 of the resonant cavity structure 115 illustrated in FIG. 1. In the embodiment depicted, optical beam 111 passes through the periodic regions of dielectric layer 105 and of polysilicon 117 and 118 of resonant structure 115 from left to right.

In the illustrated example, it is assumed that a higher voltage V1 is applied to polysilicon region 117 by signal 129 and a lower voltage V2 is applied to polysilicon region 118 by signal 131. In this embodiment, a net positive charge is then accumulated in polysilicon regions 117 and a net negative charge is accumulated in polysilicon regions 118. In an embodiment in which polysilicon regions 117 and 118 include p-type doped semiconductor material, a positive charge causes accumulation of holes near the borders with the regions of dielectric layer 105, while a negative charge causes depletion of holes near the borders with the regions of dielectric layer 105. In an embodiment in which polysilicon regions 117 and 118 include n-type doped semiconductor material, a positive charge causes depletion of electrons near the borders with the regions of dielectric layer 105, while a negative charge causes accumulation of electrons near the borders with the regions of dielectric layer 105.

As a result, optical beam 111 passes through the regions formed by the layers of charge carriers 201 as illustrated in FIG. 2. It is appreciated that when the voltage(s), for example V1 or V2 as illustrated in the embodiment of FIG. 2, are no longer applied to polysilicon regions 117 and 118, the layers of charge carriers 201 are no longer formed along the sides of polysilicon regions 117 and 118. Consequently, the charge density of the free charge carriers is modulated in response to signal 129.

In one embodiment, the phase of optical beam 111 passing through charged regions 201 is modulated due to the plasma optical effect. The plasma optical effect arises due to an interaction between the optical electric field vector and free charge carriers that may be present along the propagation path of the optical beam 111. The electric field of the optical beam 111 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers also lead to absorption of the optical field as optical energy is used up, to accelerate the free charge carriers. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \qquad \text{(Equation 1)}$$

with the optical wavelength λ and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \qquad \text{(Equation 2)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

Thus, in one embodiment of the present invention, the index of refraction of the periodically spaced polysilicon regions 117 is modulated in response to the modulation of the integrated circuit signal 129. Thus, if we assume that the periodically spaced polysilicon regions 117 of have an index refraction of $n_2$, then $n_2$ is modulated in response to the integrated circuit signal 129.

Assuming further that the dielectric layer 105 has an index of refraction of $n_1$, the reflectivity R at the interface between the dielectric layer 105 and the polysilicon region 117 can be determined by:

$$R = ((n_1 - n_2)/(n_1 + n_2))^2 \qquad \text{(Equation 3)}$$

Since, as discussed above, the index of refraction $n_2$ of polysilicon regions 117 is modulated in response to the integrated circuit signal 129, the reflectivity R of the resonant cavity structure 115 is also modulated in response to the integrated circuit signal 129.

Figure 3:
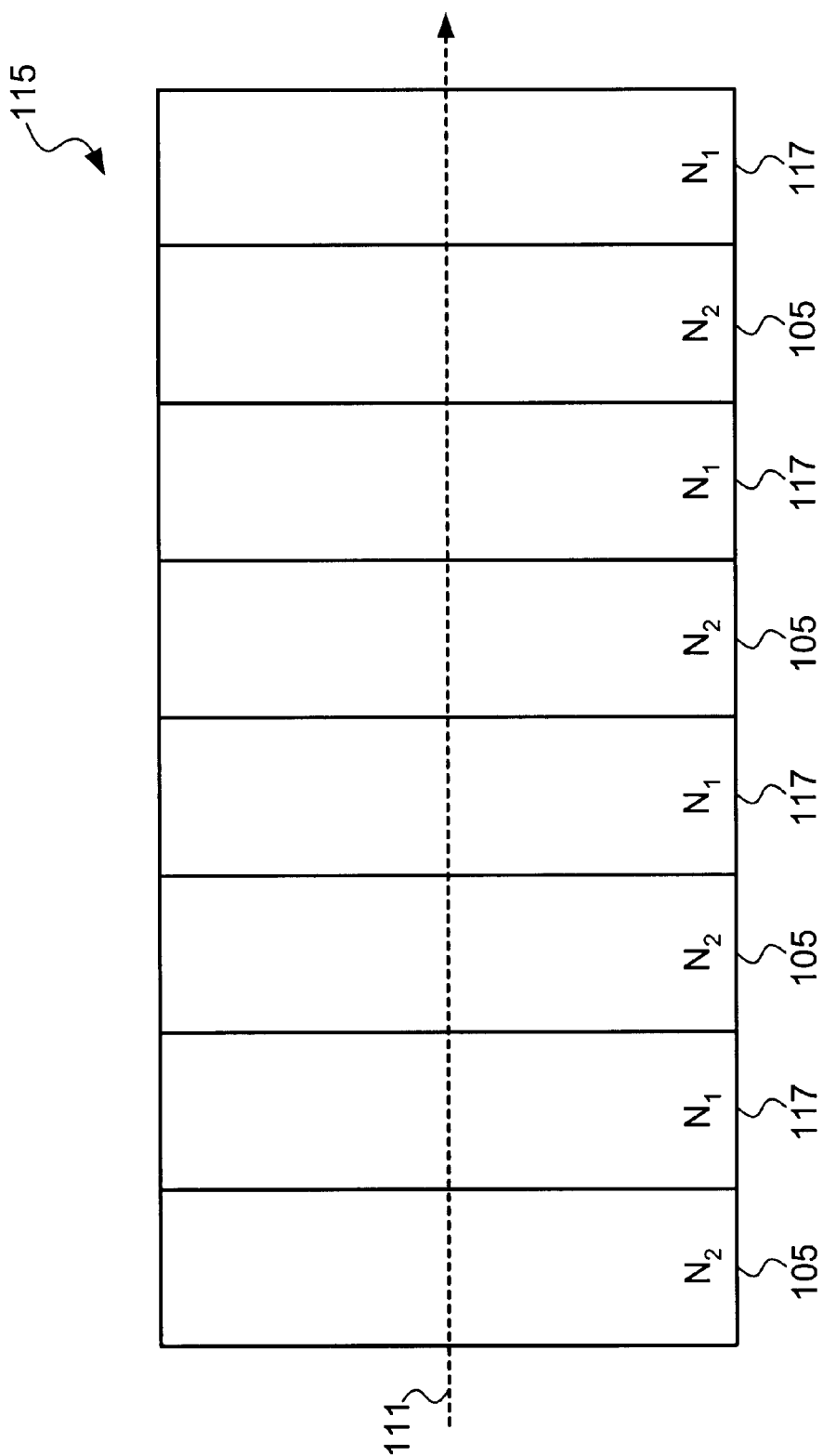
FIG. 3 is a top view illustration showing the periodic structure of one embodiment of a resonant cavity structure including alternating regions of having alternating indexes of refraction in accordance with the teachings of the present invention.

FIG. 3 is a top view illustration showing the periodic structure of one embodiment of a resonant cavity structure 115 including alternating regions of having alternating indexes of refraction in accordance with the teachings of the present invention. As shown in FIG. 3, resonant cavity structure 115 includes periodically spaced polysilicon regions 117 in a dielectric layer 105. Thus, as optical beam 111 passes from left to right in FIG. 3, optical beam 111 alternatingly passes through dielectric regions 105 and polysilicon regions 117.

As discussed above, in one embodiment the regions of dielectric layer 105 have an index of refraction of $n_1$, and the polysilicon regions 117 and 118 have an index of refraction of $n_2$. In order to achieve high transmittance of the whole stack, the reflections from the two faces of the dielectric region must in one embodiment approximately cancel each other. To help ensure that, the thickness of the regions of dielectric layer 105 are $$L_1 = \frac{\lambda_0 l}{2n_1}, \qquad \text{(Equation 4)}$$

where $L_1$, is the thickness of the regions of dielectric layer 105, $\lambda_0$ is the optical wavelength, l is an integer that relates to the number of regions of dielectric layer 105 in resonant cavity structure 115 and $n_1$ is the index of refraction of dielectric layer 105. As can be appreciated to those skilled in the art, Equation 4 expresses the condition that a double-pass through the dielectric layer 105 contains an integer number of wavelengths and so reduces the reflected power originating at each dielectric layer 105 interface.

In one embodiment, in order for the modulation from each layer to add up in phase, the thickness L1 of the regions of dielectric layer 105 and the thickness L2 of the polysilicon regions 117 and 118 are $$L_1 = \frac{\lambda_0 \tilde{l}}{n_1},$$ (Equation 5)

$$L_2 = \frac{\lambda_0 \tilde{m}}{n_2},$$ (Equation 6)

where $L_1$ is the thickness of the regions of dielectric layer 105, $\lambda_0$ is the optical wavelength, $\tilde{l}$ is an integer that relates to the number of regions of dielectric layer 105 in resonant cavity structure 115, $n_1$ is the index of refraction of dielectric layer 105, $L_2$ is the thickness of polysilicon regions 117 and 118, $\tilde{m}$ is an integer that relates to the number of polysilicon regions 117 and 118 in resonant cavity structure 115, and $n_2$ is the index of refraction of polysilicon regions 117 and 118. As can be appreciated to those skilled in the art, Equations 5 and 6 express the condition that the charge layers are an integer number of wavelength apart.

In another embodiment, the thicknesses $L_1$ and $L_2$ of the layers are chosen to result in high losses in optical beam 111 when off, and result in lower losses when on. Although in that case the equations would be different since the transmitted beams should be out-of phase for the unbiased case, but the physics of the device is similar, as can be appreciated to those skilled in the art.

Referring back to FIG. 1 polysilicon regions 117 and 118 are in one embodiment limited in the lateral direction by layers of silicon dioxide, thus forming a mesa-like structure relative to a front side surface 106 of semiconductor substrate 103. The width of the polysilicon mesa, or waveguide, is chosen to support the desired number of modes in the device. In one embodiment, typical widths could be from 1–20 micrometers. In one embodiment, a layer of silicon dioxide is formed between the semiconductor substrate 103 and the polysilicon regions 117 and 118. As a result, optical beam 111 is better confined in the vertical direction in the region of resonant cavity structure 115, resulting in less optical power loss into the substrate. In one embodiment, the silicon dioxide formation discussed above is accomplished by utilizing standard MOS fabrication processes.

In one embodiment, the lateral dimension of the resonant cavity structure 115 does not exceed several wavelengths of optical beam 111 such that the resonant cavity structure 115 supports only one electromagnetic mode (i.e. a single mode device). It is appreciated that there are applications that do not need single mode propagation. In these other applications, wider resonant cavity structures may be utilized.

In one embodiment, the resonant cavity structure 115 is biased such that when a voltage is applied by signal 129 indicates an active logical state, optical beam 111 passes through resonant cavity structure 115. Otherwise, optical beam 111 is internally reflected within resonant cavity structure 115. In another embodiment, the resonant cavity structure 115 is biased such that when the voltage applied by signal 129 indicates the active logical state, optical beam 111 does not pass through resonant cavity 115. Otherwise, optical beam 111 passes through resonant cavity structure 115.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method for modulating an optical beam, comprising:
   directing the optical beam into a resonant cavity structure disposed in a dielectric layer proximate to a semiconductor substrate of an integrated circuit die; and
   modulating a resonant wavelength of the resonant cavity structure in response to an integrated circuit signal of the integrated circuit die.

2. The method of claim 1 further comprising directing the optical beam out of the resonant cavity structure and out of the integrated circuit die.

3. The method of claim 2 wherein directing the optical beam into the resonant cavity structure comprises deflecting the optical beam into the resonant cavity structure and directing the optical beam out of the integrated circuit die comprises deflecting the optical beam out of the integrated circuit die.

4. The method of claim 2 wherein directing the optical beam into the resonant cavity structure comprises diffracting the optical beam into the resonant cavity structure and directing the optical beam out of the integrated circuit die comprises diffracting the optical beam out of the integrated circuit die.

5. The method of claim 2 wherein directing the optical beam into the resonant cavity structure comprises directing the optical beam through a back side of the semiconductor substrate through the semiconductor substrate and directing the optical beam out of the integrated circuit die comprises directing the optical beam through the semiconductor substrate out the back side of the semiconductor substrate.

6. The method of claim 2 wherein directing the optical beam into the resonant cavity structure comprises directing the optical beam through a front side of the semiconductor substrate through the semiconductor substrate and directing the optical beam out of the integrated circuit die comprises directing the optical beam through the semiconductor substrate out the front side of the semiconductor substrate.

7. The method of claim 2 wherein directing the optical beam into the resonant cavity structure comprises directing the optical beam through a side of the integrated circuit die and into the resonant cavity structure and directing the optical beam out of the integrated circuit die comprises directing the optical beam out from the resonant cavity structure and out through the side of the integrated circuit die.

8. The method of claim 1 wherein modulating the resonant wavelength of the resonant cavity structure comprises modulating an index of refraction of periodically spaced polysilicon regions of a dielectric stack of the resonant cavity structure in response to the integrated circuit signal.

9. The method of claim 1 wherein modulating the resonant wavelength of the resonant cavity structure comprises modulating a free charge density in periodically spaced polysilicon regions of a dielectric stack of the resonant cavity structure in response to the integrated circuit signal.

10. An optical modulator, comprising:
    a resonant cavity structure disposed in a dielectric layer proximate to a semiconductor substrate of an integrated circuit die, the resonant cavity structure coupled to receive an integrated circuit signal of the integrated circuit die;

a first optical element optically coupled to the resonant cavity structure, the first optical element to direct an optical beam directed to the first optical element through the semiconductor substrate through the resonant cavity structure, the resonant cavity structure to modulate the optical beam in response to the integrated circuit signal; and a second optical element optically coupled to the resonant cavity structure, the optical beam to be directed to the second optical element from resonant cavity structure, the second optical element to direct the optical beam out of the semiconductor substrate.

11. The optical modulator of claim 10 wherein the resonant cavity structure comprises a dielectric stack including periodically spaced regions of polysilicon in the dielectric layer, the resonant cavity having a resonant wavelength, the periodically spaced regions of polysilicon coupled to receive the integrated circuit signal.

12. The optical modulator of claim 11 wherein the optical beam has a wavelength substantially equal to the resonant wavelength of the resonant cavity.

13. The optical modulator of claim 11 wherein the periodically spaced regions of polysilicon are alternatingly coupled to receive opposite polarities of the integrated circuit signal.

14. The optical modulator of claim 11 wherein the periodically spaced regions of polysilicon are alternatingly coupled to receive the integrated circuit signal and ground.

15. The optical modulator of claim 1 1 wherein a charge density in each of the periodically spaced regions of polysilicon is modulated in response to the integrated circuit signal.

16. The optical modulator of claim 11 wherein an index of refraction of each of the periodically spaced regions of polysilicon is modulated in response to the integrated circuit signal.

17. The optical modulator of claim 11 wherein a reflectivity of each of the periodically spaced regions of polysilicon is modulated in response to the integrated circuit signal.

18. The optical modulator of claim 10 wherein the first and second optical elements comprise deflectors.

19. The optical modulator of claim 10 wherein the first and second optical elements comprise diffractive optics.

20. The optical modulator of claim 10 wherein the optical beam comprises infrared or near infrared light.

21. The optical modulator of claim 10 wherein the optical beam is to enter the semiconductor substrate through a back side of the semiconductor substrate.

22. The optical modulator of claim 10 wherein the optical beam is to exit the semiconductor substrate through a back side of the semiconductor substrate.

23. An optical modulator, comprising:

a semiconductor substrate of an integrated circuit die, the semiconductor substrate having a front side and a back side;

a dielectric layer of the integrated circuit die, the dielectric layer disposed proximate to the semiconductor substrate; and a resonant cavity structure disposed within the dielectric layer; the resonant cavity structure coupled to receive an integrated circuit signal of the integrated circuit die, an optical beam to be directed through the semiconductor substrate and into the dielectric layer into the resonant cavity structure, the resonant cavity structure to modulate the optical beam in response to the integrated circuit signal, the optical beam to be directed out of the resonant cavity structure, out of the dielectric layer and out of the semiconductor substrate.

24. The optical modulator of claim 23 further comprising:

a first deflector to direct the optical beam into the resonant cavity structure; and a second deflector to direct the optical beam from the resonant structure out of the semiconductor substrate.

25. The optical modulator of claim 23 further comprising:

a first diffractor to direct the optical beam into the resonant cavity structure; and a second diffractor to direct the optical beam from the resonant cavity structure out of the semiconductor substrate.

26. The optical modulator of claim 23 wherein the resonant cavity structure comprises a dielectric stack including periodically spaced regions of polysilicon in the dielectric layer, the resonant cavity having a resonant wavelength, the periodically spaced regions of polysilicon coupled to receive the integrated circuit signal.

27. The optical modulator of claim 26 wherein the periodically spaced regions of polysilicon are alternatingly coupled to receive opposite polarities the integrated circuit signal.

28. The optical modulator of claim 26 wherein the periodically spaced regions of polysilicon are alternatingly coupled to receive the integrated circuit signal and ground.

29. The optical modulator of claim 26 wherein the optical beam has a wavelength of substantially equal to the resonant wavelength.

30. The optical modulator of claim 26 wherein the semiconductor substrate comprises silicon and the dielectric layer comprises silicon dioxide.

* * * * *